United States Patent [19]

Bush et al.

[11] Patent Number: 4,973,471

[45] Date of Patent: Nov. 27, 1990

[54] METHOD FOR PRODUCING DUST-FREE SODIUM DITHIONITE

[75] Inventors: Joseph L. Bush, Chesapeake; Charles E. Winslow, Norfolk, both of Va.

[73] Assignee: Hoechst Celanese Corporation, Somerville, N.J.

[21] Appl. No.: 373,163

[22] Filed: Jun. 29, 1989

[51] Int. Cl.$^5$ ............ C01B 17/66; B01D 19/00; C09K 3/00

[52] U.S. Cl. ............ 423/515; 423/265; 252/188.22; 252/188.23

[58] Field of Search ............ 423/515, 516, 265, 266; 252/188.21, 188.22, 188.23, 188.26, 188.27

[56] References Cited

U.S. PATENT DOCUMENTS

| | | | |
|---|---|---|---|
| 3,197,289 | 7/1965 | Rodgers | 423/266 |
| 3,287,276 | 11/1966 | Poschmann et al. | 423/515 |
| 3,677,699 | 7/1972 | Fujiwara | 423/515 |
| 3,856,696 | 12/1974 | Stanbank et al. | 423/515 |
| 4,622,216 | 11/1986 | Winslow et al. | 423/515 |

FOREIGN PATENT DOCUMENTS 49-125294 11/1974 Japan .................. 423/515

*Primary Examiner*—Gary P. Straub
*Attorney, Agent, or Firm*—Depaoli & O'Brien

[57] ABSTRACT

There is disclosed a method for the production of dust-free sodium dithionite from the reaction of a alkaline formate sulfur dioxide and an alkaline metal agent in the presence of a thiosulfate reactive compound by introducing a water-soluble polymer having a molecular weight less than 60,000 and delaying the start of the alkaline metal agent until the sodium formate and the sulfur dioxide have begun to be introduced into the reactor.

9 Claims, No Drawings

METHOD FOR PRODUCING DUST-FREE SODIUM DITHIONITE

BACKGROUND OF THE INVENTION

This invention relates to the manufacture of anhydrous alkali dithionites (hydrosulfites) by reacting an alkaline formate, an alkali metal agent, and sulfur dioxide in an alcohol/water solvent. It particularly relates to improving this process by producing a dust-free product.

In the process for the manufacture of alkali metal dithionites from an alkali metal salt of formic acid, an alkali metal hydroxide, carbonate or bicarbonate, and sulfur dioxide, the product precipitates in an alcohol/water solution. Upon completion of the dithionite reaction, the product is separated from the reaction filtrate, also termed the mother liquor, by filtration. The filter cake is washed with alcohol to remove the adhering filtrate, and the product is dried. The alcohol in both the filtrate and the wash alcohol is purified for re-use by distillation.

It is well known in the manufacture of dithionites that a portion of the dithionite product decomposes during the course of the reaction to form thiosulfate. Furthermore, this decomposition is autocatalytic with respect to thiosulfate; as the concentration of thiosulfate increases, so does its rate of formation.

It is also known that certain organic compounds are capable of reacting with or complexing thiosulfates. For example, U.S. Pat. No. 4,622,216 describes a method in which certain organic compounds are added during the course of producing dithionites to react with thiosulfate and thus minimize the decomposition reaction. These thiosulfate-reactive compounds include epoxy compounds such as ethylene oxide, propylene oxide, butyl and isobutyl oxide, epichlorohydrin, and epibromohydrin as well as halogenated hydrocarbons of the general formula RX or XRD, where R is an alkyl group of carbon number 1 to 8, or an allyl, methallyl, or ethylallyl group, and X is a halogen.

When such thiosulfate-reactive compounds are added to a batch reactor, they destroy thiosulfate ions as they are being formed within the reaction vessel and minimize destruction of the sodium dithionite product. The yield of anhydrous sodium dithionite is thereby increased. The disclosure of U.S. Pat. No. 4,622,216 is herein incorporated by reference. This invention relates to an improvement in the process of U.S. Pat. No. 4,622,216.

When sodium hydrosulfite (sodium dithionite) is produced from sodium formate, sulfur dioxide and an alkali method compound such as sodium hydroxide, the resulting dry product is obtained in high yield with a good purity and with excellent throughput and productivity. The product sodium hydrosulfite does contain, however, a variable quantity of small particles described as dust. While sodium hydrosulfite is not toxic, the dust is irritating and objectionable to those handling the material both at the manufacturing end and the user end. A certain amount of dust is typical of all sodium hydrosulfite made via any of the many sodium formate based processes as reported in the patent literature. (U.S. Pat. No. 3411875, 4126716, 4081521, 3917807, 3714340, 3897544, 4017593, 3826818, 3947559.) Microscopic examination of the sodium hydrosulfite particles reveals that, rather than being single crystals, they are agglomerates of a large number of much smaller, needle-like, individual crystals. Because of this configuration, the particles are relatively fragile. The many needle-like protrusions from the central mass are easily broken off, creating dust. The various manufacturing steps of filtering, drying, blending, conveying and packaging are performed in as gentle a manner as possible, yet result in a quantity of dust in the final packaged product that is somewhat variable, batch-to-batch.

No instrumental method of testing for "dustiness" has been found that correlates well with the "dustiness" perceived by a person handling the material. As a result, a means of quantifying the perceived dust has been devised and is described as follows:

1. Four standards varying from very little dust (No. 1) to very dusty (No. 4) were prepared and placed in glass jars with ample head space so that on inversion of the jar the suspended dust could be observed.

2. An identical quantity in an identical jar of a sample to be tested could then be inverted simultaneous with the various standards so that the perceived dust could be compared. In this way the sample could be rated on a numerical scale of from No. 1 to No. 4.

Both pilot plant and plant production batches are generally rated in the No. 2 to No. 4 dust categories, with a far lesser number of batches falling in the No. 1 category.

It has been found that the crystal habit of the product sodium dithionite is substantially modified by the addition of certain water soluble polymers to the reactor in which the sodium hydrosulfite is synthesized and crystallized. This crystal habit modification is such that the normally needle-like individual crystals become more-or-less cubical, and of a much larger size. Single crystals are still in the minority, but the bulk of the particles consist of a relatively small number of cubical crystals firmly bonded together. The resulting product is physically robust, and much less subject to mechanical attrition than the sodium hydrosulfite produced in the absence of the polymer. As a result, dust in the final product is minimal or non-existent; all products are rated as No. 1 or better with respect to dust.

While this discovery is unique to the manufacture of sodium dithionite via the formate process, it is not without precedent. Crystal habit modification owing to the addition of small quantities of a wide variety of substances to the mother liquor from which the crystals derive has long been known and practiced. There is a large body of literature—textbooks, journal articles, patents, and trade brochures—describing the results of such additions, but none shed light on why the phenomenon exists, nor give guidance towards selecting a material which will produce the desired result. The closest chemical to sodium hydrosulfite found in any of the literature is zinc dithionite crystallized via an evaporative process. U.S. Pat. No. 3,197,289 describes the use of a polyacrylamide of molecular weight 400,000 to 5,000,000, or gum resins of molecular weight 300,000 to 9,000,000, or nonionic polymers of ethers of cellulose of molecular weight 500,000 to 4,000,000 to alter the crystals of zinc dithionite. These polymers must be used in conjunction with glycerine and via a procedure specific to the production of zinc dithionite. None of the mentioned polymers were found to be of any benefit in reducing the dustiness of sodium dithionite. Not only does the crystal form of sodium dithionite differ from that of zinc hydrosulfite, but the conditions of crystallization in the respective manufacturing processes are so totally different that it would not be expected that crystal habit modifiers effective for the one would be effective for the other.

Various classes of compounds, other than polymers, suggested in the literature as being effective in specific cases were tested. These classes included surfactants, dispersants and salts other than sodium hydrosulfite. None shown any benefit.

Of all the water soluble polymers tested, one class, acrylics, showed excellent promise in both modifying the crystal habit and reducing the dustiness of the product. By acrylics is meant the polymers of acrylic acid, acrylamide, and various acrylates and methacrylates. In this class of polymers, those of molecular weight greater than about 200,000 are of no benefit. The greatest benefit is derived from those acrylic polymers of molecular weight less than about 60,000.

In using these acrylic polymers in the pilot plant, it was further discovered that the results achieved in reducing the dustiness of the product sodium hydrosulfite could be further improved by modification of the standard batch operating procedure. There are three major raw material streams to be fed to the sodium hydrosulfite synthesis reactor. These are a methanol solution of sulfur dioxide, a water solution of sodium hydroxide or other alkali, and a water solution of sodium formate. Past practice has been to start the sodium formate stream first, followed by a simultaneous start of the sodium hydroxide and sulfur dioxide streams. More consistently low dust values were achieved, however, when the sodium formate and sulfur dioxide streams were first started simultaneously, followed by initiation of the sodium hydroxide feed, or when the sodium formate stream was started first, followed sequentially by first the sulfur dioxide stream, then the sodium hydroxide stream. Either of these modes of operation produce temporarily a more acid condition within the reactor. It is believed that this greater acidity delays nucleation to some extent, and enables an essentially perfect repeatability from batch to batch in yielding a dustless sodium hydrosulfite product.

When this procedural change is involved without using one of the water soluble acrylic polymers, little or no benefit accrues to the product dust. Using an acrylic polymer without the procedural change results always in an improved dust number for the product, but the improvement is somewhat variable. The combination of the two, procedural change and addition of an acrylic polymer, results always in an essentially dust-free product.

The minimum quantity of the water soluble acrylic polymer that has been found necessary to achieve optimum results is 50 ppm based on the entire contents of the sodium dithionite synthesis reactor at the completion of a batch. Up to 200 ppm gives equally good results. Quantities less than 50 ppm are definitely of benefit, but the dustiness of the product increases as the concentration of polymer decreases below 50 ppm. The preferred concentration range is 50 to 200 ppm. Quantities in excess of 200 ppm may, of course, be used, but no additional benefit accrues to using this excessive amount, and there is an economic penalty.

SUMMARY OF THE INVENTION

It is accordingly an object of this invention to provide a method for producing dust-free sodium dithionite via the formate process.

It is another object to modify the crystal habit of the product sodium dithionite such that the resulting particles are physically robust and will not suffer attrition owing to various handling operations.

It is another object to accomplish the above objectives without detriment to the yield or assay of the product sodium dithionite.

In accordance with these objects and the principals of this invention, it has been discovered that the addition of a water soluble acrylic polymer to the reactor prior to commencing the reaction will accomplish the objectives. The water soluble acrylic polymer may be of acrylic acid, methacrylic acid, sodium methacrylate, acrylamide, various acrylates or various methacrylates. The molecular weight of the selected polymer may be as high as 200,000, but is preferably less than 60,000 and most preferably from 5000 to 40,000. The quantity of polymer to be used is preferably in the range of about 50 ppm to about 200 ppm based on the total weight of material within the reactor at the conclusion of a batch.

It has further been discovered that a modification of the standard batch operating procedure enhances the results achieved through use of the water soluble acrylic polymer. The modification consists of starting the sodium formate and sulfur dioxide feed streams first and simultaneously, followed by start of the sodium hydroxide feed stream, or starting the sodium formate feed first, followed sequentially by the sulfur dioxide feed, then the sodium hydroxide feed, as compared to the previous practice of starting the sodium formate feed stream first followed later by the simultaneous start of the sulfur dioxide and sodium hydroxide feed streams. The enhancement of the results achieved is that each and every batch will give optimal performance with the procedural modification as opposed to always good, but somewhat variable performance without the procedural modification.

DESCRIPTION OF THE PREFERRED EMBODIMENT

As a basis for comparison, dust number evaluations for products from each of the two commercial plants which operate in the conventional mode were gathered. In addition, dust number evaluations for products from the pilot plant operated in both the conventional mode and using the modified operational procedure were gathered. These data are listed in Table I as Examples 1, 2, 3 and 4 respectively. Examples 5 through 15 in Table I demonstrate the preferred embodiment of the invention as used in the pilot plant, while Example 16 shows the preferred embodiment as used in the plant. Each of these examples shows the results achieved in reducing the dustiness of the product sodium dithionite through addition of an acrylic polymer to the synthesis reactor along with first starting the sodium formate feed stream, next starting the sulfur dioxide feed stream, followed by start of the sodium hydroxide feed stream, or by simultaneous start of the sodium formate and sulfur dioxide streams followed by start of the sodium hydroxide feed. In each of the examples where polymer was used, the polymer, as a 20% solution in water, was added to the methanol charged to the synthesis reactor prior to commencing flow of the various raw material feed streams. The quantity of 20% polymer solution was that required to yield the desired concentration of polymer based on the total contents of the reactor at the conclusion of the batch. Example 17 demonstrates the somewhat erratic results achieved with the conventional operating procedure. The dust number reported, 1.3, is the average of seven individual batches of dust number 1 0, 1.5, 1.0, 2.0,, 1.5, 1.0, 1.0.

XA-1007, Cordova Chemical Co., Polyethylene imine, M.W. 300
Dequest 2000, Monsanto Chemical Co.

TABLE I

| | | REDUCTION OF SODIUM DITHIONITE DUST | | | | |
|---|---|---|---|---|---|---|
| Example Number | Product Source | Operating Procedure | Polymer Type | Polymer M.W. | Conc. ppm | Dust Number |
| 1 | Plant #1 | Conventional | None | — | — | 2.9 |
| 2 | Plant #2 | Conventional | None | — | — | 3.3 |
| 3 | Pilot Plant | Conventional | None | — | — | 3.1 |
| 4 | Pilot Plant | Modified | None | — | — | 3.0 |
| 5 | Pilot Plant | Modified | Acrylamide | 5000 | 200 | 1.0 |
| 6 | Pilot Plant | Modified | Acrylamide | 5000 | 100 | 1.0 |
| 7 | Pilot Plant | Modified | Acrylamide | 5000 | 50 | 1.0 |
| 8 | Pilot Plant | Modified | Acrylic Acid | 1000 | 50 | 1.0 |
| 9 | Pilot Plant | Modified | Part Neutralized Acrylic Acid | 2000 | 50 | 1.0 |
| 10 | Pilot Plant | Modified | Acrylic Acid | 7000 | 50 | 1.0 |
| 11 | Pilot Plant | Modified | Acrylic Acid | 8000 | 50 | 1.0 |
| 12 | Pilot Plant | Modified | Sodium Methacrylate | 10,000 | 50 | 1.0 |
| 13 | Pilot Plant | Modified | Sodium Acrylate | 30,000 | 50 | 1.0 |
| 14 | Pilot Plant | Modified | Acrylate | 60,000 | 50 | 1.5 |
| 15 | Pilot Plant | Modified | Acrylamide | 200,000 | 50 | 1.5 |
| 16 | Plant #2 | Modified | Acrylamide | 5,000 | 50 | 1.14 |
| 17 | Pilot Plant | Conventional | Acrylamide | 5,000 | 50 | 1.3 |

Identify of Polymers Used In Examples 5-17
5, #6, #7, #16, #17 American Cyanamid Co., Cyanamer P-35.
8 Celanese Corp., Celcatex 5501-A
9 Colloids Inc., Colloid 142
10 Celanese Corp., Celcatex 5007-A
11 Colloids Inc., Colloid 117
12 Colloids Inc., Colloid 239
13 Celanese Corp., Celcatex 3540-N
14 Colloids Inc., Colloid 202
15 American Cyanamid Co., Cyanamer A-370

It is to be noted that many water-soluble polymers were tried and the following table is a list of those which are not effective in producing a dust-free product.

LIST OF POLYMERS THAT ARE NOT EFFECTIVE

Separan NP-10, Dow Chemical Co.
Polyacrylamide, N.W. 1,500,000
Cyanamer P-250, American Cyanamid Co.
Polyacrylamide, M.W. 5,000,000
Percol 726, Allied Colloids, Inc.
Polyacrylamide, M.W. 11,000,000
Cyanamer P-21, American Cyanamid Co.
Acrylamide Co-Polymer, M.W. 200,000
Cellosize QP-3L, Union Carbide Corp.
Hydroxyethyl cellulose, M.W. 100,000
Cellosize QP-4400H, Union Carbide Corp.
Hydroxyethyl cellulose, M.W. 650,000
Polyox N-10, Union Carbide Corp.
Polyethylene Oxide, M.W. 100,000
Polyox 303, Union Carbide Corp.
Polyethylene oxide, M.W. 7,000,000
Mirapol WT, Miranol Chemical Co., Inc.
Ureylene Quaternary Ammonium, M.W. 2,200
Corcat P-12, Cordova Chemical Co.
Polyethylene imine, M.W. 1,200
Corcat P-18, Cordova Chemical Co.
Polyethylene imine, M.W. 1,800
Corcat P-150, Cordova Chemical Co.
Polyethylene imine, M.W. 10,000
Corcat P-600, Cordova Chemical Co.
Polyethylene imine, M.W. 60,000
XA-1010, Cordova Chemical Co.
Polyethylene imine, M.W. 600

Aminotri (methylenephosphonic acid), M.W. 299
Dequest 2010, Monsanto Chemical Co.
1-Hydroxyethylidene-1, 1-diphosphonic acid, M.W. 206
Dequest 2060, Monsanto Chemical Co.
Diethylenetriaminepenta-(methylenephosphonic acid), M.W. 573
Belperse 161, Ciba-Geigy Corp.
Polyphosphinopropenoioc acid, M.W. ?
Belclene 200, Ciby-Geigy Corp.
Polymaleic acid, M.W. 500-1,000
Belclene 400, Ciba-Geigy Corp.
Acrylamidosulfonic acid co-polymer, M.W. 5,000

The following procedures illustrate a conventional Pilot Plant operation, a modified Pilot Plant operation where the order of feeds is changed, a conventional plant operation and a modified plant operation where the order of feed is changed.

Please note that the main difference between the Pilot Plant and the commercial operation is that the caustic is mixed with some sodium formate in the Pilot Plant while they are fed as separate streams in commercial operation.

CONVENTIONAL PILOT PLANT OPERATION PROCEDURE

To a 100-gallon reactor, 150 pounds of distilled recovered methanol containing methyl formate and sulfur dioxide was added as a first feed. Next, as a second feed, 5 pounds of 96% sodium formate dissolved in 4 pounds of water were added to the reactor. The reactor contents were heated to 50° C. with agitation. At this temperature, a third feed, consisting of 310 pounds of distilled recovered methanol, of the same composition as the first feed and containing sulfur dioxide of a quantity such that in the first and third feeds there would be a total of 201 pounds of sulfur dioxide, began to be fed to the reactor. The feed rate was controlled so that 80% of its total amount was fed to the reactor in 65 minutes. The fourth feed consisted of 127 pounds of 96% sodium formate, 104 pounds of water, and 67 pounds of 99% sodium hydroxide. The fourth feed was started simultaneous with the third feed, and its feed rate was controlled so that it was fed in its entirety in 65 minutes. A fifth feed of 3.3 pounds of pure ethylene oxide was started simultaneously with the fourth feed. Its feed rate was controlled so that it was fed in its entirety in 195 minutes.

Owing to the exothermic nature of the reaction, the mixture self-heated to 84° C. over a 15-minute period. Temperature control was then initiated to maintain 84° C. throughout the course of the reaction. Owing to the evolution of carbon dioxide, the reactor pressure increased to 40 psig during this 15-minute period, and pressure control was then initiated to maintain 40 psig throughout the course of the The vented carbon dioxide left the reactor through condensers and a scrubber which was fed at a rate of 0.34 pounds/minute with essentially pure recovered methanol. When the fourth feed terminated, the rate of feed of the third feed was reduced so that the remaining 20% was fed over an additional 65 minutes. At the conclusion of this feed, an additional 65-minute period was allowed for the reaction to go to completion, at which time the ethylene oxide feed ended. The reactor contents were cooled to 73° C. and were discharged to a filtering apparatus wherein the mother liquor was separated from the crude product which was then washed with 190 pounds of essentially pure recovered methanol. The filter cake was vacuum dried to yield the anhydrous product.

MODIFIED PILOT PLANT OPERATION PROCEDURE USING POLYMER

To a 100-gallon reactor, 150 pounds of distilled recovered methanol containing methyl formate and sulfur dioxide was added as a first feed. To this was added the appropriate quantity of a 20% water solution of the polymer. Next, as a second feed, 5 pounds of 96% sodium formate dissolved in 4 pounds of water was added to the reactor. The reactor contents were heated to 50° C. with agitation. At this temperature, a third feed, consisting of 310 pounds of distilled recovered methanol, of the same composition as the first feed and containing sulfur dioxide of a quantity such that in the first and third feeds there would be a total of 201 pounds of sulfur dioxide, began to be fed to the reactor. The feed rate was controlled so that 80% of its total amount was fed to the reactor in 67.6 minutes. The fourth feed consisted of 127 pounds of 96% sodium formate, 104 pounds of water, and 67 pounds of 99% sodium hydroxide. The fourth feed was started 2.6 minutes after the third feed, and its feed rate was controlled so that it was fed in its entirety in 65 minutes. A fifth feed of 3.3 pounds of pure ethylene oxide was started simultaneously with the fourth feed. Its feed rate was controlled so that it was fed in its entirety in 195 minutes.

Owing to the exothermic nature of the reaction, the mixture self-heated to 84° C. over a 15-minute period. Temperature control was then initiated to maintain 84° C. throughout the course of the reaction. Owing to the evolution of carbon dioxide, the reactor pressure increased to 40 psig during this 15-minute period, and pressure control was then initiated to maintain 40 psig throughout the course of the reaction.

The vented carbon dioxide left the reactor through condensers and a scrubber which was fed at a rate of 0.34 pounds/minute with essentially pure recovered methanol. When the fourth feed terminated, the rate of feed of the third feed was reduced so that the remaining 20% was fed over an additional 65 minutes. At the conclusion of this feed, an additional 65-minute period was allowed for the reaction to go to completion, at which time the ethylene oxide feed ended. The reactor contents were cooled to 73° C. and were discharged to a filtering apparatus wherein the mother liquor was separated from the crude product which was then washed with 190 pounds of essentially pure recovered methanol. The filter cake was vacuum dried to yield the anhydrous product.

PLANT CONVENTIONAL OPERATION PROCEDURE

An initial charge of 1000 gallons of distilled recovered methanol was placed in the synthesis reactor and heated to 50° C. with agitation. Three major raw material streams were to be fed to the reactor: 5680 lb of sodium formate as a 60% solution in water, 8670 lb of sulfur dioxide as a 43% solution in methanol, and 2770 lb of sodium hydroxide as a 73% solution in water. The sodium formate feed was started first with the feed rate adjusted to feed the entire quantity in 68 minutes. After three minutes the sulfur dioxide and sodium hydroxide feeds were started. The sodium hydroxide rate was controlled to feed the entire batch quantity in 65 minutes, ending simultaneous with the sodium formate feed. The sulfur dioxide feed rate was controlled to feed only 80% of the batch total in 65 minutes. Ethylene oxide was also added to the reactor to control decomposition. The total quantity was 120 lb, fed at a rate controlled to complete this feed in 195 minutes.

Owing to the exothermic nature of the reaction, the mixture self-heated to 84° C. over a 15-minute period. Temperature control was then initiated to maintain 84° C. throughout the course of the reaction. Owing to the evolution of carbon dioxide, the reactor pressure increased to 40 psig during this 15-minute period, and pressure control was then initiated to maintain 40 psig throughout the course of the reaction.

The vented carbon dioxide left the reactor through condensers and a scrubber which was fed at a rate of 1.5 gallons/minute with essentially pure recovered methanol. At the end of 65 minutes, the rate of feed of the sulfur dioxide solution was reduced so that the remaining 20% was fed over an additional 65 minutes. At the conclusion of this feed, an additional 65-minute period was allowed for the reaction to go to completion, at which time the ethylene oxide feed ended. The reactor contents were cooled to 73° C. and were discharged to a filtering apparatus wherein the mother liquor was separated from the crude product which was then washed with 1200 gal of essentially pure recovered methanol. The filter cake was vacuum dried to yield the anhydrous product.

PLANT MODIFIED OPERATION PROCEDURE USING POLYMER

An initial charge of 1000 gallons of distilled recovered methanol was placed in the synthesis reactor and heated to 50° C. with agitation. To this was added the appropriate quantity of a 20% water solution of the polymer. Three major raw material streams were to be fed to the reactor: 5680 lb of sodium formate as a 60% solution in water, 8670 lb of sulfur dioxide as a 43% solution in methanol, and 2770 lb of sodium hydroxide as a 73% solution in water. The sodium formate and sulfur dioxide feeds were started simultaneously, with the sodium formate feed rate controlled to feed the entire batch amount in 67.6 min., and the feed rate of the sulfur dioxide controlled to feed 80% of the batch amount also in 67.6 min. After 2.6 min the sodium hydroxide feed was started with its feed rate controlled so that the entire batch amount was fed in 65 min., ending simultaneous with the sodium formate feed. Ethylene oxide was also added to the reactor to control decomposition. The total quantity was 120 lb, fed at a rate controlled to complete this feed in 195 min.

Owing to the exothermic nature of the reaction, the mixture self-heated to 84° C. over a 15-minute period. Temperature control was then initiated to maintain 84° C. throughout the course of the reaction. Owing to the evolution of carbon dioxide, the reactor pressure increased to 40 psig during this 15-minute period, and pressure control was then initiated to maintain 40 psig throughout the course of action.

The vented carbon dioxide left the reactor through condensers and a scrubber which was fed at a rate of 1.5 gallons/minute with essentially pure recovered methanol. At the end of 65 minutes, the rate of feed of the sulfur dioxide solution was reduced so that the remaining 20% was fed over an additional 65 minutes. At the conclusion of this feed, an additional 65-minute period was allowed for the reaction to go to completion, at which time the ethylene oxide feed ended. The reactor contents were cooled to 73° C. and were discharged to a filtering apparatus wherein the mother liquor was separated from the crude product which was then washed with 1200 gal of essentially pure recovered methanol. The filter cake was vacuum dried to yield the anhydrous product.

What is claimed is:

1. In the process for producing sodium dithionite by reacting sulfur dioxide, sodium formate, sodium hydroxide or carbonate and a thiosulfate-reactive material in the presence of water and organic solvent in a suitable reactor, so as to form said sodium dithionite and a mother liquor, separating said sodium dithionite from said mother liquor and drying the same, the improvement which comprises; initially adding to said reactor at least 50 ppm based on total reactor contents of a water soluble acrylic polymer having a molecular weight less than 60,000 and starting the sodium hydroxide or sodium carbonate feed stream after the sodium formate and sulfur dioxide feed streams have been started and recovering dust-free sodium dithionite.

2. The water soluble polymer has a molecular weight of about 5,000–40,000.

3. The process of claim 2 wherein the organic solvent is methanol.

4. The process of claim 3 the thiosulfate reactive compound is ethylene oxide.

5. The process of claim 3 with thiosulfate reactive compound is propylene oxide.

6. The process of claim 3 wherein the water soluble polymer is polyacrylamide.

7. The process of claim 3 wherein the water soluble polymer is polyacrylic acid.

8. The process of claim 3 wherein the water soluble polymer is sodium polymethacrylate.

9. The process of claim 3 wherein the water soluble polymer is sodium polyacrylate.

* * * * *